United States Patent

[11] 3,590,213

| [72] | Inventor | Robert A. Caldwell |
| | | York, Pa. |
| [21] | Appl. No. | 867,802 |
| [22] | Filed | Oct. 20, 1969 |
| [45] | Patented | June 29, 1971 |
| [73] | Assignee | Allis-Chalmers Manufacturing Company |
| | | Milwaukee, Wis. |

[54] ARC STARTING DEVICE FOR LONG
ELECTRICAL STICKOUT ARC WELDING
1 Claim, 3 Drawing Figs.

[52] U.S. Cl. .............................................. 219/130,
219/136
[51] Int. Cl. ............................................. B23k 9/00
[50] Field of Search ................................. 219/130,
137, 131

[56] References Cited
UNITED STATES PATENTS
| 2,951,934 | 9/1960 | Engel ................... | 219/130 |
| 3,010,012 | 11/1961 | Tuthill ................... | 219/131 |

Primary Examiner—J. V. Truhe
Assistant Examiner—George A. Montanye
Attorneys—John P. Hines, Robert B. Benson and Arthur M. Streich ABSTRACT: An electrode holder having a pair of axially spaced electrode guides for use in arc welding. The electrode passes through these guides or tips and makes electrical contact with each tip. Means are provided to selectively direct electrical current to one or both of the tips. The tip closest to the work is connected in the electrical circuit to provide current to the electrode at a point adjacent to the workpiece to initiate the arc. Once the arc is started, this tip is isolated from the electrical circuit, and the current is provided to the electrode through the tip remote from the workpiece to permit long electrical stickout arc welding.

PATENTED JUN29 1971  3,590,213
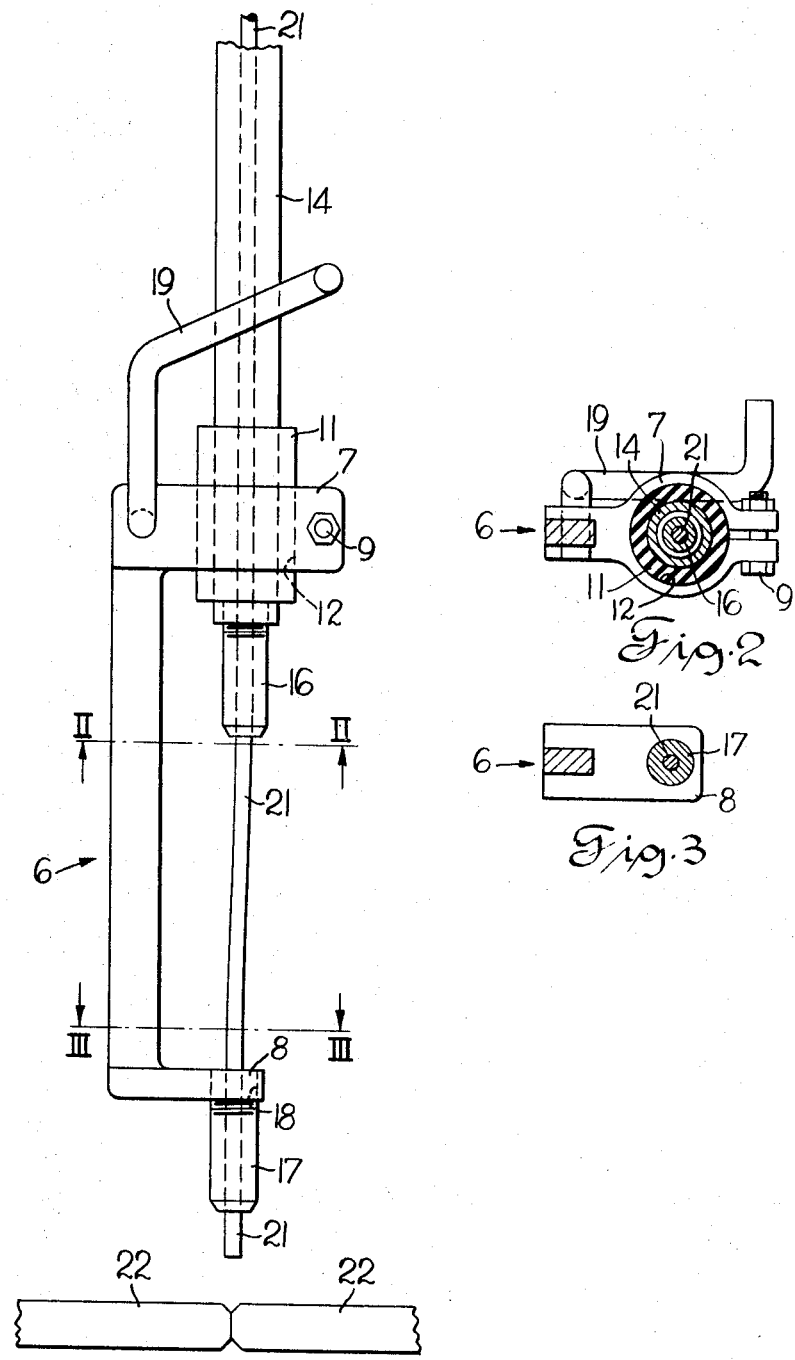
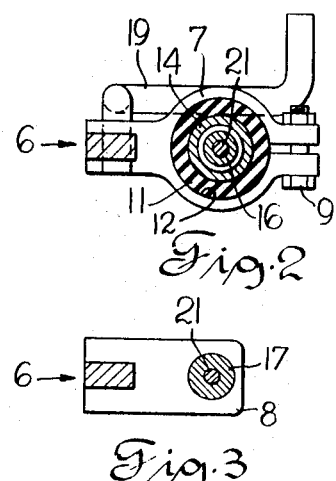
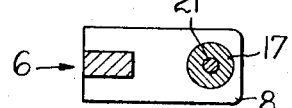
Fig.-1
Fig.2
Fig.3
Inventor
Robert A. Caldwell
by John P. Hines
Attorneys

ARC STARTING DEVICE FOR LONG ELECTRICAL STICKOUT ARC WELDING

This invention pertains in general to arc welding and more particularly to an electrode holder for arc welding which permits a simplified arc initiating means and also provides long stickout welding after the arc has been initiated.

In arc welding and particularly in submerged arc welding, long electrical stickout offers to fabricators a very high deposition rate of weld metal. Long electrical stickout means in effect that the electrode extends a relatively long distance from the point of contact with the electrical current to the workpiece. This high deposition rate in long electrical stickout welding is attributed to the I R effect, and the ability to use higher currents without excessive penetration into the work metal. Even with the beneficial high deposition rate of weld metal, long electrical stickout welding is seldom used because of the difficulties involved in starting the arc.

It is the general intention and main object of this invention to provide an arc welding holder which permits the use of long electrical stickout welding and provides means to easily initiate the welding arc.

A more specific object of the subject invention is to provide an electrode holder with a pair of axially spaced electrode guides wherein means are provided to selectively direct electric current to both guides or only that guide most remote from the workpiece.

These and other objects of the subject invention will become more fully apparent as the following description is read in light of the attached drawing where:

FIG. 1 is a side elevation of a preferred form of electrode holder constructed in accordance with the invention;

FIG. 2 is a partial cross section taken along the line II–II of FIG. 1; and

FIG. 3 is a partial cross section taken along the line III–III of FIG. 1.

Referring to the attached drawing, the preferred embodiment of the invention as shown herein for purposes of illustration is composed of a main base portion 6 which is generally C-shaped as shown and includes a pair of axially spaced parallel extending legs 7 and 8. The main base portion and the legs may be constructed of any well-known electrically conductive material, such as aluminum.

As shown herein for purposes of illustration, in FIG. 2 the leg 7 is split at its free end. Aligned bores are provided through the split ends of the leg 7 and a bolt 9 is provided therethrough. An electrical insulating sleeve 11 is contained in a bore 12 extending through the leg 7. An electrically conductive electrode carrying conduit 14 extends through the insulating sleeve 11 which electrically isolates the conduit from the leg. An electrode guide or tip 16 is connected to the end of the conduit 14. This tip 16 has an opening therethrough to match the size of the electrode or welding wire which is to be used in the particular welding operation. The electrode tip 16 is also electrically insulated from the leg 7.

A second electrode guide or tip 17 is connected to the leg 8 in any conventional manner. Herein the tip 17 is shown threadably received into an internally threaded bore 18 in the leg 8. The two electrode tips 16 and 17 are in substantial alignment with one another except for a slight offset as shown in FIG. 1. This offset of alignment between the two welding tips is to insure sufficient pressure of the welding wire against the welding tips so that adequate electrical contact is maintained between each tip and the welding wire. The electrode tip 16 is electrically isolated from the tip 17; however, as shown herein for purposes of illustration, the tip 17 is electrically connected to the main base portion 6 of the electrode holder.

Means are provided to selectively connect the tip 17 to the electrical conduit 14 to provide electrical current from the conduit through the tip 17 to the welding wire. As shown herein for purposes of illustration, these means are in the form of a bar 19. This bar 19 is pivotally contained in a bore provided in the main base portion 6 o the electrode holder. The bar 19 may be made of any electrically conductive material, such as copper and is pivotally movable into or out of engagement with the electrical conduit 14. When the bar 19 is in contact with the conduit 14 as shown in FIG. 1, the tip 17 is hot, providing electrical current through this tip to the welding wire. When the bar 19 is moved out of contact with the electrode conduit 14, the tip 17 is isolated from the electrical circuit, and current then flows only through the tip 16 to the welding wire.

In operation the welding wire 21 is passed through both tips and extends from the tip 17 close to engagement with the workpiece 22. The bar 19 is moved into engagement with the electrode conduit 14 causing current to flow through the main base portion 6 of the electrode holder and through the tip 17 into the welding wire 21. Because of the close proximity of the tip 17 to the workpiece 22, an electrical arc can be initiated quite easily. After the arc has been initiated, the bar 17 is moved out of contact with the electrode conduit 14, isolating the tip 17 from the electrical circuit. In this case, the current then flows through the tip 16 into the welding wire 21 which is considerably remote from the workpiece 22. Since the arc has already been initiated, even though the tip 16 is remote from the workpiece, the arc will be maintained, and long electrical stickout welding can be performed with the advantage of the high deposition rate of the weld material to the workpiece.

I claim:

1. A holder for guiding welding wire to a workpiece during arc welding comprising: a main base portion constructed of an electrical conductive material; a first apertured conductive element constructed of electrical conductive material connected to said main base portion and electrically insulated therefrom; a welding tip constructed of electrical conductive material connected in electrical current carrying contact to said main base portion in spaced substantial alignment with said first apertured conductive element said welding tip being disposed closer to the workpiece than the first apertured conductive element during the welding operation welding wire being in electrical current carrying contact with and passing through successively both said first apertured conductive element and said welding tip and a second electrically conductive element connected to said main base portion and selectively movable into and out of direct mechanical and electrical contact with said first apertured conductive element to direct and interrupt the flow of electrical current to said welding tip.